Feb. 11, 1958   J. K. LENTZ ET AL   2,823,284
ELECTRODE ASSEMBLY
Filed Oct. 3, 1956
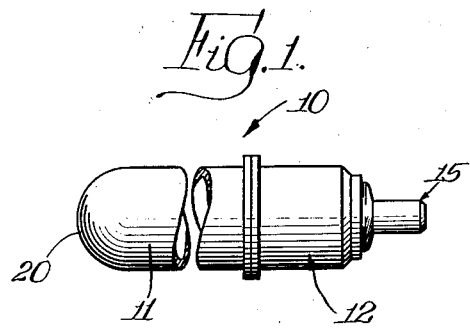
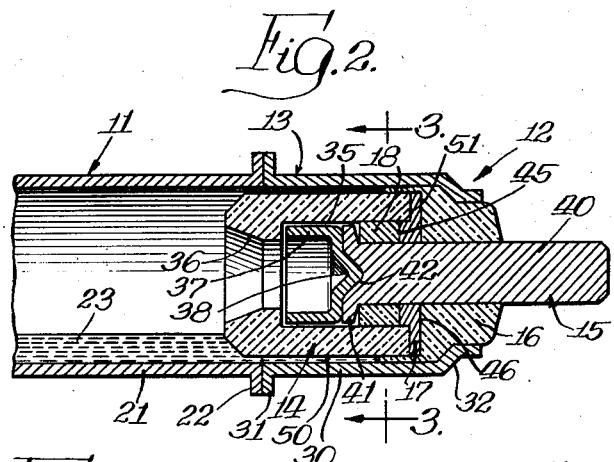
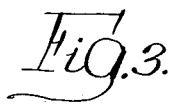
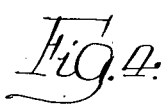
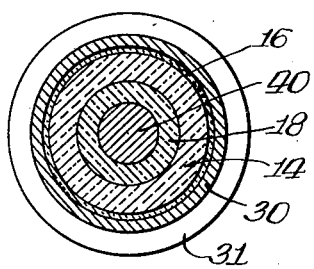
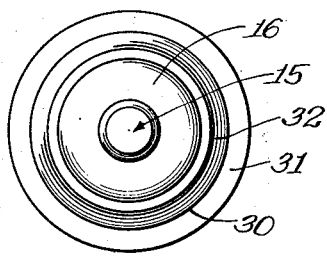
*INVENTORS.*
Joseph K. Lentz,
Arthur A. Grunwald,
By Brown, Jackson, Boettcher & Dienner
Atty's

United States Patent Office 2,823,284
Patented Feb. 11, 1958

2,823,284

ELECTRODE ASSEMBLY

Joseph K. Lentz, Elkhart, Ind., and Arthur A. Grunwald, Edwardsburg, Mich., assignors to Durakool, Inc., Elkhart, Ind., a corporation of Indiana Application October 3, 1956, Serial No. 613,783

15 Claims. (Cl. 200—152)

Our present invention relates generally to electrode assemblies and more particularly to improvements in electrode assemblies for use with mercury switches, relays and the like.

In recent years, it has become practice to construct mercury switches and relays in which a first electrode, comprising essentially a shell or casing containing a body of mercury, is open at one end and sealed off by a second electrode assembly. The second electrode assembly includes a rod-like electrode, a ceramic or insulator member for retaining a body of mercury in contact with such second electrode and an annular metal sleeve or eyelet for maintaining the insulator and second electrode in assembled relation, the latter being insulated from said sleeve by a fused seal of insulating material. The sleeve is usually attached directly to the shell or first electrode. A typical example of such a construction is to be found in Patent No. 2,545,629 issued to J. W. Posey et al. on March 20, 1951.

The ceramic member of the second electrode assembly is usually formed with an interior chamber or cup for capturing a body of mercury as it makes contact with the second electrode member which extends through such ceramic insulator. The ceramic insulator, as a consequence, is subject to high temperatures at making and breaking of circuit between the first and second electrodes. Ideally, the seal member used to bond the second electrode, ceramic and metal sleeve together should be of identical thermal characteristics so that the expansion and contraction of such sub-assembled elements would be the same, thereby avoiding disruption of their assembled relationship. However, due to the fact that the ceramic member of the electrode assembly bears the brunt of the higher temperatures, it is normally subject to greater expansion than the remaining elements of the assembly. Practice has proven, therefore, that it is necessary to insure against disrupting the bond between the ceramic member and the seal employed to fuse or bond such ceramic to the electrode and outer metal sleeve or eyelet of the second electrode in order to maintain integrity of the sealed atmosphere within the shell forming the first electrode.

While various degrees of success have been experienced in matching thermal expansion coefficients of the several elements involved in such an electrode assembly, no true and completely satisfactory assembly having desired durability in use has heretofore been presented. Of particular importance in the problem of forming such a fused electrode assembly is the connection between the ceramic (which is subject to the extreme temperatures created by arcing at the making and breaking of circuit with the second electrode) and the seal member, which is employed to bond the ceramic member to the second electrode and the annular metal sleeve of such assembly. It is to this particular problem that the aspects of our present invention pertain.

Briefly, the high temperatures caused by the making and breaking of circuit in a mercury switch or relay are at times greatly in excess of the softening temperature of available ceramic materials which satisfactorily match the thermal expansion characteristics of sealing glasses and metals used in such devices. The problem of reducing these temperatures or their effect may be solved, in part, by employing a ceramic arc shield around the electrode which has a decidedly different coefficient of thermal expansion from the metals and seal materials used therewith. However, by thus mismatching the thermal characteristics of the ceramic and glass seal, especially, serious stresses are created which tend to disrupt the necessary integrity of the seal. It is to this stress problem that the present invention pertains and presents a satisfactory solution. In general, we propose to permit the ceramic arc shield member to substantially float freely in its assembled relation with the main sealing material while at the same time maintaining a secure bonded relation between the ceramic and the metal electrode. This latter bonded relation is in part maintained by a compression seal between the ceramic and metal electrode and in part by a fusion seal therewith. By permitting the necessary expansion and contraction of the ceramic without causing corresponding disruption of the seal of the assembly, we are able to maintain satisfactory relation for the entire electrode assembly and improve the general operating durability of a device of this class.

The main object of our invention is to provide a new and improved electrode assembly for use with mercury switches and relays.

Another object of our invention is to provide a new and improved electrode assembly comprising an electrode, a ceramic member, for retaining a body of mercury in contact with the electrode, and an annular metal sleeve, the aforementioned elements being maintained in assembled relation by means of seals of fused insulating material.

A further object of our invention is to provide an electrode assembly of the character aforesaid in which the several elements thereof such as the electrode, the ceramic member, the sleeve and the fused seal are so related as to permit radial independent expansion and contraction of the ceramic member without disrupting the unitary relation of the assembled elements over the range of temperatures to which they are subject in the operation of an associated mercury switch or relay.

Still another object of our invention is to provide an improved mercury switch or relay having a metal shell open at one end and forming a first electrode to which an electrode assembly, including a second electrode mounted in insulated relation within an annular metal sleeve presents a means for sealing off the open end of the first electrode; the relation of the elements of such an electrode assembly permitting radial expansion and contraction of a ceramic insulator while avoiding disruption of the bond or sealed relation of the electrode assembly.

A still further object of our invention is to provide a new and improved electrode assembly for sealing off the open end of a tubular electrode shell or casing in a mercury relay or switch.

A still additional object of our invention is to provide an electrode assembly of the character immediately aforesaid which is capable of withstanding temperatures accompanying the operation of a mercury switch or relay related therewith without disrupting the sealed relation between a body of mercury and the atmosphere.

Another object of our present invention is to provide a new and improved electrode assembly for sealing off the end of an open electrode shell or casing in a mercury to mercury contact relay or switch which demonstrates improved operating characteristics and operational durability.

The above and further objects, features and advantages of our invention will be recognized by those familiar with the art from the following detailed description and specifications of a preferred form thereof illustrated in the accompanying drawings.

In the drawings:

Figure 1 is a side elevational view broken away and foreshortened to illustrate a typical mercury switch structure with which our present invention is employed;

Figure 2 is an enlarged partial cross-sectional view through the upper electrode of the switch demonstrated in Figure 1, showing the internal arrangement of elements in our improved electrode assembly;

Figure 3 is a cross-sectional showing taken substantially at line 3—3 of Figure 2; and Figure 4 is an end elevational view of the electrode assembly seen in Figures 1 and 2.

Referring now to Figure 1, the switch 10 therein shown is a mercury to mercury contact type comprising a tubular metal outer shell 11 to one end of which an electrode assembly, indicated generally by numeral 12, is mounted. The electrode assembly, as shown in detail in Figure 2 of the drawings, comprises a generally annular metal sleeve 13, a tubular ceramic insulator or arc shield 14 insertable concentrically within said sleeve 13, an electrode post 15 adapted to fit concentrically within sleeve 13 and ceramic 14, a first glass seal 16 joining the electrode post 15 to sleeve 13, an annular disc type ceramic insulator 17 joined by seal 16 to electrode 15 and sleeve 13 and a second annular glass bead or seal 18 joining the ceramic 14 to electrode 15 and having fused connection with the disc insulator 17.

The outer metal shell 11 for the switch comprises a hollow metal cylinder closed over at one end 20 and forming a first electrode of the mercury switch. The cylindrical wall 21 of shell 11 is suitably turned outwardly at one end in an annular flange, as at 22, adjacent and surrounding the open upper or outer end of the shell 11. A body of mercury 23 is carried within the confines of the shell 11 for closing circuit between the shell electrode 11 and the second rod-like electrode post 15; shell 11 and electrode 15 being connected to a suitable operating electric circuit by means known to those familiar with the art. Preferably shell 11 is formed of stainless steel, nickel, nickel coated steel or other similar materials.

The electrode assembly 12, as shown in Figure 2, demonstrates a preferred form of our invention. As seen from that figure, the outer metal sleeve 13 includes a cylindrical body portion 30 having an outwardly turned annular flange portion 31 for connection with flange 22 of the metal shell 11. These two flange portions are normally welded or otherwise locked together in sealed engagement at final assembly. The upper or opposite end of sleeve 13 is crimped inwardly as at 32 in a substantially frusto-conical formation. Sleeve 13 may be formed of any suitable metal capable of being welded to the outer shell 11 and preferably having substantially matching thermal expansion characteristics with the glass bead or seal member 16 and shell 11.

The ceramic insulator or arc sheld 14 may be made of any suitable ceramic as, for example, a dense refractory material capable of withstanding high temperatures such as normally accompany the disruption of circuit between electrodes 15 and 11. As shown, the ceramic is in the form of a substantially cylindrical shell having a smaller outside diameter than the inside diameter of the cylindrical wall portion 30 of sleeve 13. Ceramic 14 is further formed with an internal bore 35 extending inwardly from one open end thereof. Chamber or bore 35 communicates at one end with a substantially frusto-conical throat portion 36 leading to the interior of the metal shell 11 for the passage of the mercury 23. A substantially cylindrical metal cup member 37 is supported with its open end adjacent the inner end of bore 35 in juxtaposition of the divergent throat 36 to receive the body of mercury 23 as it passes through such throat.

In regard to cup 37 it will be noted that while the same is open along one end to communicate with throat 36, a closed end wall thereof is dimpled outwardly as at 38. Such dimpled portion 38 of the cup 37 is welded or otherwise fixed to an associated end of the rod-like electrode 15 which is suitably indented or socketed to receive the projection of the dimple 38. This structure appears to be a marked advantage in the construction of a bi-part electrode assembly as shown, in that the formation of the dimple 38 centers the cup relative to the electrode and furnishes an increased area or surface for a welded connection between the cup and the electrode post 15.

With respect to electrode post 15, it will be noted that the same constitutes substantially a cylindrical shank portion 40, one end 41 of which is flanged outwardly and contains a recess 42 for receiving the dimpled portion 38 of cup 37. Normally, the shank portion 40 and the cup member 38 are pre-assembled in welded relation to present a unitary structure, with such electrode structure preferably being made of nickel, nickel coated steel, or any other suitable electrical conductor.

As shown, in assembly, the cup portion 37 is inserted within bore 35 so that the open mouth of the cup 37 is in direct communication with the throat portion or opening 36 of the ceramic 14. The shank portion 40 of the electrode thus extends axially outward of shell 13 for fused combination therewith by means of bead 16; the latter having a substantially matching coefficient of thermal expansion with cup 37 and electrode 15.

In combining the ceramic member 14 with the electrode 15, the substantially annular glass bead 18 is employed about the shank portion 40 of the electrode 15 and beneath the ceramic disc 17. Glass bead 18 extends between the electrode 15 and the internal face of the adjacent end portion of bore 35 in ceramic member 14. In the assembly of parts the glass bead 18 securely fuses with ceramic 14 and bonds the same concentrically about electrode 15. Likewise the glass 18 bonds at one end, as indicated at 45, with the adjacent inner surface of the ceramic disc 17. This sub-assembly is then arranged for combination with the outer metal sleeve 13 and seal bead 16 as will now be set forth.

It will be particularly appreciated that when combining the outer sleeve 13 with the two ceramic members 14 and 17 and electrode 15 as described, ceramic 14 is placed with its frusto-conical bore or throat portion 36 downwardly so that the latter communicates with the interior of shell 11. In this position the electrode 15 extends coaxially outwardly of the inwardly crimped portion 32 of the metal sleeve 13. The glass bead 16 is preferably preformed and placed inwardly of such crimped portion 32 to receive the shank portion 40 therethrough. So assembled, bead 16 engages shank portion 40 of the electrode and the adjacent outer surface 46 of the ceramic disc 17. Upon application of the proper heat the glass bead 16 suitably melts and fuses with the ceramic disc 17, the shank of the electrode 15 and the inside wall of the outer metal sleeve 13 at and about the inwardly crimped portion 32 thereof. The members of the electrode assembly are thus united in a unitary fashion.

The glass bead 16 preferably matches, or is compatible with, the coefficients of thermal expansion for the material comprising sleeve 13, electrode 15, disc 17 and bead 18.

In this regard, it has been found that ceramic material sold under the trademark "Alsimag 196" serves admirably for fabricating disc 17. This material has a softening temperature of 2624° F. and a thermal expansion coefficient of $9.8 \times 10^{-6}$. Its thermal expansion coefficient is readily compatible with known materials for fabrication of sleeve 13, electrode 15 and glass beads 16 and 18 as aforementioned.

With this arrangement, thermal expansion and contraction of the sleeve 13, the electrode 15, and the beads 16 and 18, will match to substantially prevent the disruption of the sealed bond therebetween.

As finally assembled, it will be noted that ceramic insulator 14 resides in concentric spaced relationship with respect to the internal wall of cylindrical portion 30 of the outer metal shell 13, the same being piloted by a downwardly set shoulder on ceramic disc 17. This spacing is indicated generally by numeral 50. A portion of the glass bead 16 invades the upper end of such space 50, as shown. It will be understood that the ceramic member 14 is subjected to high thermal impact at the disruption of circuit between the electrodes 15 and 11 of the mercury contact switch or relay. It will be noted further that there is no bonding connection between ceramic 14 and ceramic 17 at their line of interfacial contact as indicated generally by numeral 51 so that relative movement between such two members is permitted. However, the annular glass bead member 18 is fused to the internal face of bore 35 in ceramic 14 as well as to shank portion 40 of electrode 15. Under thermal impact, the ceramic 14, having a decidedly lower coefficient of thermal expansion than bead 18, and electrode 15, serves to restrict the radial expansion of bead 18, thereby providing a compression seal with the same. With respect to ceramic 14 we have found that ceramic material sold under the trademark "Alsimag 491" is well suited for the purpose. It is characterized by a softening temperature of 3182° F. and has a thermal expansion coefficient of $6.2 \times 10^{-6}$.

With this arrangement, the expansion and contraction movements of ceramic 14 as imposed by the making and breaking of circuit between the two electrodes 11 and 15 does not disrupt the integrity of the seal between electrode 15 and the outer metal shell 13 as formed by the interposed glass bead 16. Neither does it result in disruption of the seal between ceramic 14 and electrode 15, since bead 18 is held under compression as explained. With such an arrangement, we have substantially eliminated disruption of the seal in this type of mercury switch or relay.

While we have hereinabove shown and described the features and concepts of our invention in association with a preferred form thereof, it is to be recognized that numerous changes, modifications and substitutions of equivalents may be made therein without necessarily departing from the spirit and scope of our invention. As a consequence, it is not our intention to be limited to the particular form of device herein shown and described, except as may appear in the following appended claims.

We claim:

1. In an electrode assembly, the combination of a first ceramic member having an opening extending therethrough, a second ceramic member at one end of the opening of said first ceramic member and extending transversely of the axis of said opening, an electrode having a portion projecting into said opening and extending through said second ceramic member with there being a space between the outer surface of said portion of said electrode and the wall defining the opening in said first ceramic member, and fused insulating material in said space fusing said first and second ceramic members to said electrode.

2. The combination of claim 1 characterized by said first ceramic member and said fused insulating material having mis-matching coefficients of thermal expansion.

3. An electrode assembly comprising a first ceramic member having an opening extending therethrough, a second ceramic member at one end of said first ceramic member and extending transversely of the axis of said opening, an electrode coaxial with the axis of said opening having a first portion projecting thereinto at said one end of said first ceramic member and extending through said second ceramic member with there being a first space between the outer surface of said first portion of said electrode, the wall defining the opening in said first ceramic member, and the adjacent surface of said second ceramic member, first fused insulating material in said first space for fusing said first and second ceramic members to said first portion of said electrode, a metal sleeve extending coaxially of said electrode, said electrode having a second portion projecting through said sleeve with there being a second space between the outer surface of said second portion of said electrode, the inner surface of said sleeve, and the other surface of said second ceramic member, and second fused insulating material in said second space fusing said sleeve and said second ceramic member to said second portion of said electrode.

4. The assembly of claim 3 characterized by said sleeve, said second ceramic member, said electrode, and said second fused insulating material having substantially matching coefficients of thermal expansion, and said first ceramic and said first fused insulating material having mis-matching co-efficients of thermal expansion.

5. An electrode assembly adapted to be mounted as a unit within the outer metal shell of a mercury switch or relay comprising a sub-assembly including a hollow ceramic insulator having a cylindrical bore portion extending inwardly of one end thereof and a frustro-conical portion opening inwardly of the other end thereof, a ceramic disc extending transversely of said hollow ceramic insulator at said one end thereof, electrode means comprising a cup member and a shank member, said cup member being disposed inwardly of the end of said bore with its open end in juxtaposition of said frustroconical opening, said shank member being of a diameter less than the diameter of the bore portion of said ceramic insulator member to thereby provide a first space between the wall defining said bore and the adjacent surface of said ceramic disc, and first fused insulating material in said first space for fusing said ceramic insulator and said ceramic disc to said shank member of said electrode means, a hollow sleeve extending coaxially of said sub-assembly with a second portion of said electrode means extending through one end thereof and providing a second space between the outer surface of said second portion of said shank member and the surrounding inner face of said hollow sleeve, said hollow sleeve at the portion thereof surrounding said ceramic insulator and said ceramic disc having an inner wall spaced from the outer peripheries of the latter, and second fused insulating material in said second space fusing said hollow sleeve and said ceramic disc to said second portion of said shank member of said electrode means.

6. The combination of claim 5 characterized by said hollow ceramic insulator and said first fused insulating material having mis-matching coefficients of thermal expansion, and by said ceramic disc, said shank member of said electrode means, said hollow sleeve, and said second fused insulating material having substantially matching coefficients of thermal expansion.

7. In an electrode assembly the combination of a first ceramic member having an opening extending therethrough, a second ceramic member at one end of said first ceramic member, said ceramic members having unlike coefficients of thermal expansion, an electrode extending into the opening in said first ceramic member and through said second ceramic member, and means in the opening of said first ceramic member at said one end thereof for securing said ceramic members independently of each other in sealed relation with said electrode.

8. The combination of claim 7 characterized by said last named means comprising insulating material fused to said two ceramic members and said electrode.

9. The combination of claim 8 characterized by said first ceramic member and said insulating material having substantially mis-matching coefficients of thermal expansion, and said insulating material and said second ceramic member having substantially matching coefficients of thermal expansion.

10. In an electrode assembly the combination of a first tubular ceramic member having a circular bore therein opening outwardly of one end thereof, a second disc ceramic member extending transversely of the axis of the bore of said tubular ceramic member at the open end thereof, electrode means including a cup-shaped member disposed in said bore and having a cylindrical shank portion extending therefrom axially of said bore and through said disc ceramic member, the diameter of said shank being less than the diameter of said bore to provide an annular recess at said one end of said tubular ceramic member, and an annular seal of fused insulating material disposed in said annular recess for fusing said tubular and disc ceramic members independently of each other to said shank portion of said electrode.

11. The combination of claim 10 characterized by the provision of a hollow outer metal casing extending coaxially of said electrode means, and second fused insulating material for fusing said casing to said disc ceramic member and a portion of said shank extending away from said disc ceramic member.

12. The combination of claim 11 characterized by said outer casing, said first and second fused insulating materials, said disc ceramic member and said electrode having substantially matching coefficients of thermal expansion with the first named insulating material and said first ceramic member having mis-matched coefficients of thermal expansion.

13. A seal assembly, comprising, a first ceramic member having an opening defined by a substantially cylindrical surface, a second ceramic member extending across one end of said first ceramic member and slidingly engaging the same, said second ceramic member having an opening communicating with the opening in said first ceramic member, a metal member extending through the said opening in said second ceramic member, seal means providing fused connection between said metal member and each of said ceramic members, said first ceramic member having a coefficient of thermal expansion unlike that of said seal means, and said second ceramic member being movable independently of said first ceramic member under thermal impact.

14. The combination as set forth in claim 13 in which the differential of thermal coefficients between said first ceramic member and said seal means causes the latter to be radially compressed under thermal impact to provide a compression seal between said first ceramic member and said seal means.

15. A thermal seal assembly, comprising, a metal member, a first ceramic member surrounding said metal member, and fused seal means disposed between and having fused connection with said ceramic member and said metal member, said seal means and ceramic member having unlike coefficients of thermal expansion selected to provide a compression seal between said seal means and said ceramic member due to their dissimilar rates of radial movement under thermal impact.

No references cited.